United States Patent
Huang et al.

(10) Patent No.: US 12,393,562 B2
(45) Date of Patent: Aug. 19, 2025

(54) DATA PROCESSING METHOD AND APPARATUS FOR COLUMNAR STORAGE DATA WAREHOUSE

(71) Applicant: Beijing Volcano Engine Technology Co., Ltd., Beijing (CN)

(72) Inventors: Zhaowei Huang, Beijing (CN); Yuanpu Ding, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/958,789

(22) Filed: Nov. 25, 2024

(65) Prior Publication Data
US 2025/0190413 A1  Jun. 12, 2025

(30) Foreign Application Priority Data
Dec. 6, 2023 (CN) .......................... 202311667945.4

(51) Int. Cl.
*G06F 16/22* (2019.01)
*G06F 16/23* (2019.01)

(52) U.S. Cl.
CPC ........ *G06F 16/221* (2019.01); *G06F 16/2343* (2019.01)

(58) Field of Classification Search
CPC .................................................... G06F 16/221
USPC ......................................................... 707/781
See application file for complete search history.

(56) References Cited

U.S. PATENT DOCUMENTS

2015/0222637 A1*  8/2015  Hung .................. G06F 9/54
726/1

FOREIGN PATENT DOCUMENTS

CN          113360079 A       9/2021
CN          114816219 A   *   7/2022
WO     WO-2023197865 A1  *  10/2023  ........... G06F 16/221

\* cited by examiner

*Primary Examiner* — Syling Yen
(74) *Attorney, Agent, or Firm* — Alleman Hall & Tuttle LLP

(57) ABSTRACT

A data processing method, an electronic device, and a storage medium. The data processing method includes: receiving a data write request; and in response to the target write manner being a first write manner, storing the target data in a key-value storage module by using a key-value storage manner, so that the target data is subsequently read from the key-value storage module, each row of data in the at least one row of data respectively corresponds to one key-value pair, and a data write amount corresponding to the first write manner is less than a first threshold; or, in response to the target write manner being a second write manner, storing the target data in a columnar storage module by using a columnar storage technology, a data write amount corresponding to the second write manner is greater than a data write amount corresponding to the first write manner.

16 Claims, 6 Drawing Sheets

DATA PROCESSING METHOD AND APPARATUS FOR COLUMNAR STORAGE DATA WAREHOUSE

CROSS-REFERENCE TO RELATED APPLICATION

This application claims the priority and benefits of the Chinese Patent Application No. 202311667945.4, which was filed on Dec. 6, 2023, the disclosure of which is incorporated herein by reference in its entirety as part of the present application.

TECHNICAL FIELD

The present application relates to the field of computer technologies, and in particular, to a data processing method and apparatus for a columnar storage data warehouse.

BACKGROUND

With the development of computer technologies, a large amount of data is generated, and accordingly, more and more data storage technologies appear. A columnar storage technology is a data storage technology that is widely used at present. The columnar storage technology refers to storing data by using a column as a storage granularity when table data is stored. A data storage system that stores data by using the columnar storage technology may also be referred to as a columnar storage data warehouse.

In an example, after data is generated, the data may be stored in the columnar storage data warehouse by using the columnar storage technology. In some scenarios, after the data is stored in the columnar storage data warehouse, another system, for example, an analysis system, may read the data from the columnar storage data warehouse, so as to analyze the read data.

At present, a time delay between data generation and reading, from the columnar storage data warehouse by another system, of the data is relatively long, so that a requirement for real-time analysis of the data cannot be met. Therefore, a solution is urgently needed to solve the above problem.

SUMMARY

To solve or at least partially solve the above technical problems, embodiments of the present application provide a data processing method and apparatus for a columnar storage data warehouse.

According to a first aspect, an embodiment of the present application provides a data processing method for a columnar storage data warehouse, the data processing method comprising:

receiving a data write request, where the data write request is used to request to write target data in a target write manner, the target data comprises at least one row of data;

in response to the target write manner being a first write manner, storing the target data in a key-value storage module by using a key-value storage manner, so that the target data is subsequently read from the key-value storage module, each row of data in the at least one row of data respectively corresponds to one key-value pair, and a data write amount corresponding to the first write manner is less than a first threshold;

or, in response to the target write manner being a second write manner, storing the target data in a columnar storage module by using a columnar storage technology, where a data write amount corresponding to the second write manner is greater than a data write amount corresponding to the first write manner.

Optionally, the storing the target data in a key-value storage module by using a key-value storage manner comprises:

obtaining a first key-value object corresponding to a data lock in the key-value storage module, where a key of the first key-value object indicates that the first key-value object corresponds to the data lock, and a value of the first key-value object indicates a state of the data lock;

in response to a value of the first key-value object indicating that the data lock is in an unlocked state, modifying the value of the first key-value object to obtain a second key-value object, where a value of the second key-value object indicates that the data lock is in a locked state; and storing the target data in the key-value storage module by using the key-value storage manner.

Optionally, the key of the first key-value object indicates that the first key-value object corresponds to a data lock of a first data storage unit, and the value of the first key-value object further indicates a first row number of data that has been stored in the first data storage unit; and the storing the target data in a key-value storage module by using a key-value storage manner comprises:

storing the target data in the first data storage unit in the key-value storage module by using the key-value storage manner;

correspondingly, the value of the second key-value object further indicates a second row number of data stored in the first data storage unit after the target data is stored in the first data storage unit.

Optionally, after the storing the target data in the first data storage unit in the key-value storage module by using the key-value storage manner, the data processing method further comprises:

modifying the value of the second key-value object to obtain a third key-value object, where a value of the third key-value object indicates that the data lock is in an unlocked state and the second row number of data that has been stored in the first data storage unit.

Optionally, the data processing method further comprises:

storing, by using a columnar storage technology, data stored in the first data storage unit in a columnar storage module, where the first data storage unit includes at least one batch of written data, and the at least one batch of written data comprises the target data.

Optionally, the storing, by using a columnar storage technology, data stored in the first data storage unit in a columnar storage module comprises:

obtaining first version information corresponding to the first data storage unit, where the first version information indicates a first batch corresponding to data that has been written in the first data storage unit and a second batch that is currently used for writing data; and reading, from the first data storage unit, data corresponding to the first batch, and storing, by using the columnar storage technology, the data corresponding to the first batch in the columnar storage module.

Optionally, before the reading, from the first data storage unit, data corresponding to the first batch, and storing, by using the columnar storage technology, the data corresponding to the first batch in the columnar storage module, the data processing method further comprises:

modifying a value of a fourth key-value object carrying the first version information to obtain a fifth key-value object, where a value of the fifth key-value object indicates that the data corresponding to the first batch is in a dumping state; and after the storing, by using the columnar storage technology, the data corresponding to the first batch in the columnar storage module, the data processing method further comprises:

modifying the value of the fifth key-value object to obtain a sixth key-value object, where a value of the sixth key-value object indicates that the data corresponding to the first batch has been successfully stored in the columnar storage module.

Optionally, the data processing method further comprises:

deleting, according to the value of the sixth key-value object, the data corresponding to the first batch from the key-value storage module.

Optionally, the first version information is generated in the following manner:

obtaining second version information corresponding to the first data storage unit, where the second version information indicates a first batch corresponding to data that has been included in the first data storage unit; and generating, based on the first batch, a second batch for continuing to write data in the first data storage unit; and obtaining the first version information based on the second version information and the second batch.

Optionally, before the generating, based on the first batch, a second batch for continuing to write data in the first data storage unit, the data processing method further comprises:

obtaining a data lock of the first data storage unit, and locking the data lock; and after the obtaining the first version information, the data processing method further comprises:

unlocking the data lock of the first data storage unit.

Optionally, the data processing method further comprises:

receiving a data query request;

determining a storage range, in the key-value storage module, of data requested by the data query request;

processing data in the storage range to obtain a column block that is supported by the columnar storage module for processing; and processing the column block to obtain query data that meets the data query request.

Optionally, the data query request includes a data storage unit identifier, the data storage unit identifier is used to identify a data storage unit to which data requested by the data query request belongs, and the determining a storage range, in the key-value storage module, of data requested by the data query request comprises:

determining a target batch of data stored in the data storage unit identified by the data storage unit identifier, and determining a third row number of data stored in a largest batch in the target batch, where a row corresponding to the third row number is a last row of the largest batch; and determining the storage range based on the target batch and the third row number, where the storage range is from a first row of a smallest batch in the target batch to the last row of the largest batch.

According to a second aspect, an embodiment of the present application provides a data processing apparatus for a columnar storage data warehouse, the data processing apparatus comprising:

a first receiving unit, configured to receive a data write request, where the data write request is used to request to write target data in a target write manner, the target data comprises at least one row of data; and a storage unit, configured to:

in response to the target write manner being a first write manner, store the target data in a key-value storage module by using a key-value storage manner, so that the target data is subsequently read from the key-value storage module, each row of data in the at least one row of data respectively corresponds to one key-value pair, and a data write amount corresponding to the first write manner is less than a first threshold;

or, in response to the target write manner being a second write manner, store the target data in a columnar storage module by using a columnar storage technology, where a data write amount corresponding to the second write manner is greater than a data write amount corresponding to the first write manner.

Optionally, the storing the target data in a key-value storage module by using a key-value storage manner comprises:

obtaining a first key-value object corresponding to a data lock in the key-value storage module, where a key of the first key-value object indicates that the first key-value object corresponds to the data lock, and a value of the first key-value object indicates a state of the data lock;

in response to the value of the first key-value object indicating that the data lock is in an unlocked state, modifying the value of the first key-value object to obtain a second key-value object, where the value of the second key-value object indicates that the data lock is in a locked state; and storing the target data in the key-value storage module by using the key-value storage manner.

Optionally, the key of the first key-value object indicates that the first key-value object corresponds to a data lock of a first data storage unit, and the value of the first key-value object further indicates a first row number of data that has been stored in the first data storage unit; and the storing the target data in a key-value storage module by using a key-value storage manner comprises:

storing the target data in the first data storage unit in the key-value storage module by using the key-value storage manner;

correspondingly, a value of the second key-value object further indicates a second row number of data stored in the first data storage unit after the target data is stored in the first data storage unit.

Optionally, the data processing apparatus further comprises:

a first modification unit, configured to: after the storing the target data in the first data storage unit in the key-value storage module by using the key-value storage manner, modify the value of the second key-value object to obtain a third key-value object, where a value of the third key-value object indicates that the data lock is in an unlocked state and the second row number of data that has been stored in the first data storage unit.

Optionally, the data processing apparatus further comprises:

a dumping unit, configured to store, by using a columnar storage technology, data stored in the first data storage unit in a columnar storage module, where the first data storage unit includes at least one batch of written data, and the at least one batch of written data comprises the target data.

Optionally, the dumping unit is configured to:

obtain first version information corresponding to the first data storage unit, where the first version information indicates a first batch corresponding to data that has been written in the first data storage unit and a second batch that is currently used for writing data; and read, from the first data storage unit, data corresponding to the first batch, and store, by using the columnar storage technology, the data corresponding to the first batch in the columnar storage module.

Optionally, the data processing apparatus further comprises: a second modification unit and a third modification unit;

the second modification unit is configured to: before the reading, from the first data storage unit, data corresponding to the first batch, and storing, by using the columnar storage technology, the data corresponding to the first batch in the columnar storage module, modify a value of a fourth key-value object carrying the first version information to obtain a fifth key-value object, where a value of the fifth key-value object indicates that the data corresponding to the first batch is in a dumping state; and the third modification unit is configured to: after the storing, by using the columnar storage technology, the data corresponding to the first batch in the columnar storage module, modify the value of the fifth key-value object to obtain a sixth key-value object, where a value of the sixth key-value object indicates that the data corresponding to the first batch has been successfully stored in the columnar storage module.

Optionally, the data processing apparatus further comprises:

a deletion unit, configured to delete, according to the value of the sixth key-value object, the data corresponding to the first batch from the key-value storage module.

Optionally, the first version information is generated in the following manner:

obtaining second version information corresponding to the first data storage unit, where the second version information indicates a first batch corresponding to data that has been included in the first data storage unit; and generating, based on the first batch, a second batch for continuing to write data in the first data storage unit; and obtaining the first version information based on the second version information and the second batch.

Optionally, the data processing apparatus further comprises: an obtaining unit and an unlocking unit;

the obtaining unit is configured to: before the generating, based on the first batch, a second batch for continuing to write data in the first data storage unit, obtain a data lock of the first data storage unit, and lock the data lock; and the unlocking unit is configured to: after the obtaining the first version information, unlock the data lock of the first data storage unit.

Optionally, the data processing apparatus further comprises:

a second receiving unit, configured to receive a data query request;

a determination unit, configured to determine a storage range, in the key-value storage module, of data requested by the data query request;

a processing unit, configured to process data in the storage range to obtain a column block that is supported by the columnar storage module for processing; and a query unit, configured to process the column block to obtain query data that meets the data query request.

Optionally, the data query request includes a data storage unit identifier, the data storage unit identifier is used to identify a data storage unit to which data requested by the data query request belongs, and the determination unit is configured to:

determine a target batch of data stored in the data storage unit identified by the data storage unit identifier, and determine a third row number of data stored in a largest batch in the target batch, where a row corresponding to the third row number is a last row of the largest batch; and determine the storage range based on the target batch and the third row number, where the storage range is from a first row of a smallest batch in the target batch to the last row of the largest batch.

According to a third aspect, an embodiment of the present application provides an electronic device, where the device comprises a processor and a memory;

the processor is configured to execute instructions stored in the memory, so that the device executes the data processing method according to any one of the first aspect and the possible implementations of the first aspect.

According to a fourth aspect, an embodiment of the present application provides a computer-readable storage medium, comprising instructions, where the instructions instruct a device to execute the data processing method according to any one of the first aspect and the possible implementations of the first aspect.

According to a fifth aspect, an embodiment of the present application provides a computer program product which, when running on a computer, causes the computer to execute the data processing method according to any one of the first aspect and the possible implementations of the first aspect.

BRIEF DESCRIPTION OF DRAWINGS

In order to more clearly describe the technical solutions in the embodiments of the present application or in the prior art, the following briefly introduces the accompanying drawings required for describing the embodiments or the prior art. Apparently, the accompanying drawings in the following description show merely some embodiments of the present application, and persons of ordinary skill in the art may still derive other drawings from these accompanying drawings without creative efforts.

DETAILED DESCRIPTION

In order that those skilled in the art can better understand the solutions of the present application, the following clearly and completely describes the technical solutions in the embodiments of the present application with reference to the accompanying drawings in the embodiments of the present application. Apparently, the described embodiments are merely some rather than all of the embodiments of the present application. All other embodiments obtained by persons of ordinary skill in the art based on the embodiments of the present application without creative efforts shall fall within the protection scope of the present application.

The inventor(s) of the present application has found through research that in the conventional technology, after data is generated, the data may be stored in a columnar storage data warehouse by using a columnar storage technology.

Figure 1:
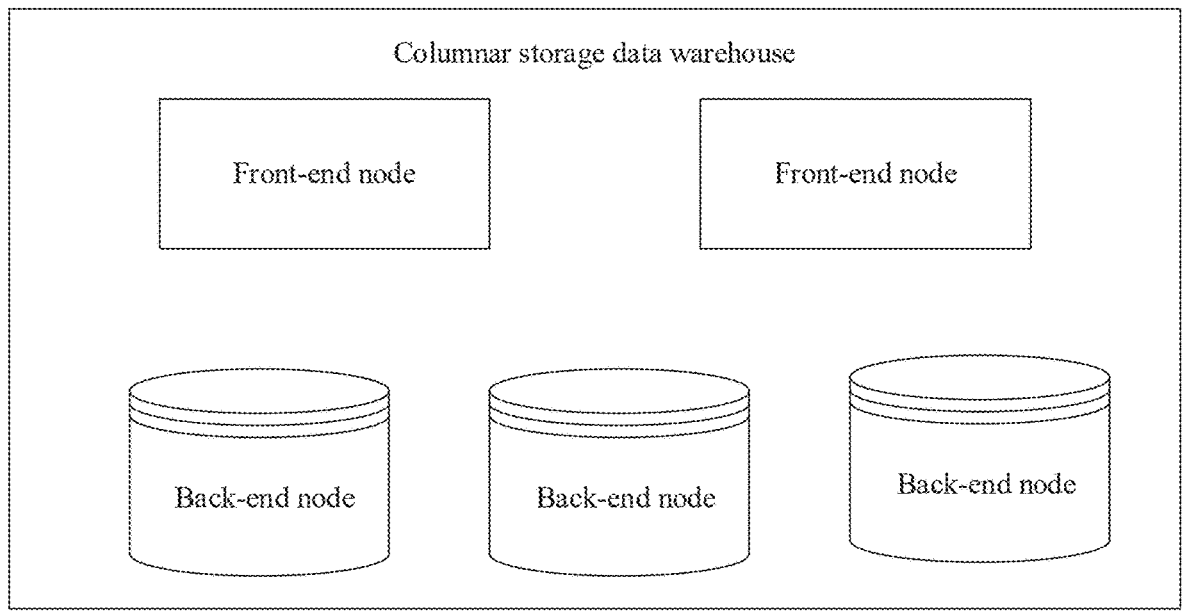
FIG. 1 is a schematic diagram of a structure of a columnar storage data warehouse according to an embodiment of the present application.

FIG. 1 is a schematic diagram of a structure of a columnar storage data warehouse according to an embodiment of the present application.

The columnar storage data warehouse shown in FIG. 1 may be a batch storage-based columnar storage data warehouse, for example, a doris storage data warehouse.

As illustrated by FIG. 1, the columnar storage data warehouse includes two front-end nodes (Frontend, FE) and three back-end nodes (Backend, BE). This is merely an example, and in practice, a quantity of front-end nodes and a quantity of back-end nodes are not limited to those shown in FIG. 1.

The front-end node is responsible for managing metadata, managing client connections, performing query planning, query scheduling, and the like. The back-end node is responsible for data storage, structured query language (Structured Query Language, SQL) statement execution, and the like.

In terms of data storage, the back-end nodes are completely equivalent, and the front-end node allocates data to a corresponding BE node based on a specific policy. During data import, data is directly written into the back-end node, and the back-end node is responsible for writing the imported data in a corresponding format and generating a related index.

When SQL calculation is performed, one SQL statement is first planned into a logical execution unit according to a specific semantics, and then split into a specific physical execution unit according to a data distribution. The physical execution unit is executed on a specific back-end node where data is stored, so that data transmission and copying can be avoided, and therefore extreme query performance can be achieved.

The columnar storage data warehouse exposes a My Structured Query Language (My Structured Query Language, MySQL) protocol interface to a client, and supports standard SQL syntax. A user can conveniently query and analyze data in the columnar storage data warehouse by using an existing MySQL client.

Figure 2:
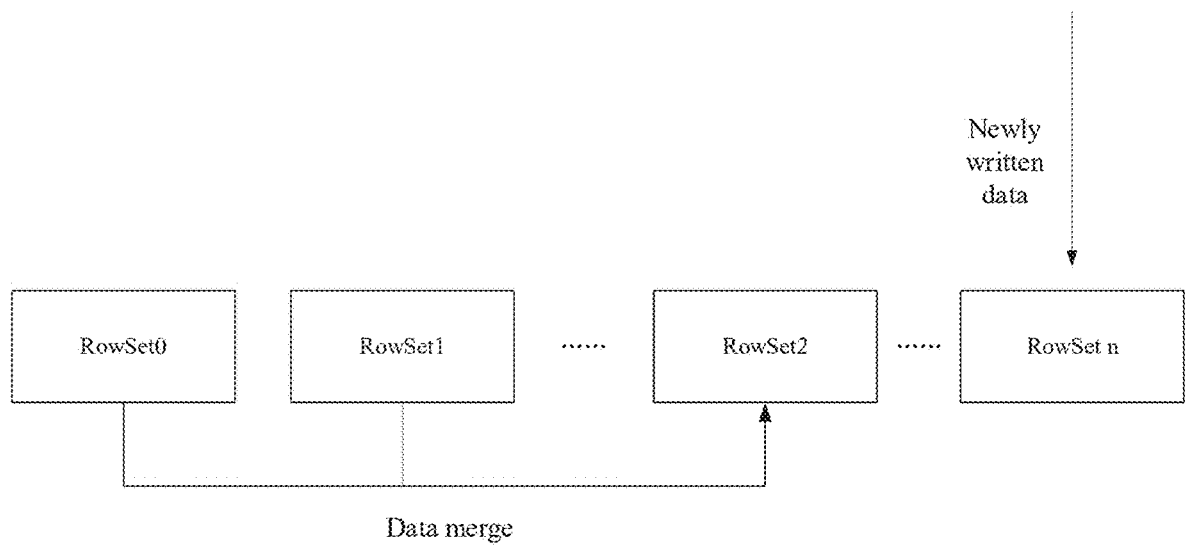
FIG. 2 is a schematic diagram of a data storage structure of a columnar storage data warehouse according to an embodiment of the present application.

A storage structure of the columnar storage data warehouse shown in FIG. 1 is similar to a structure of a log-structured merge-tree (Log-Structured Merge-tree, LSM). FIG. 2 can be used for understanding. FIG. 2 is a schematic diagram of a data storage structure of a columnar storage data warehouse according to an embodiment of the present application. FIG. 2 shows a data storage structure corresponding to one data storage unit in the columnar storage data warehouse. The data storage unit mentioned here may be understood as a smallest data management unit corresponding to the columnar storage data warehouse, and the smallest data management unit corresponding to the columnar storage data warehouse may include a plurality of tables.

As illustrated by FIG. 2, a data storage structure corresponding to one data storage unit may include a plurality of row sets (RowSet). The RowSet has a number and version information, and each time new data is written, a new RowSet is generated. Even if data corresponding to an existing RowSet is modified, a new RowSet is generated instead of modifying the RowSet. However, the RowSet in the data storage unit is merged. Specifically, a plurality of small RowSets may be combined into a large RowSet according to a rule of an LSM tree, and after the large RowSet is generated, the small RowSet that generates the large RowSet is deleted.

When data is written into the columnar storage data warehouse, if a data amount written at a single time is small, for example, a data amount written at a single time is only 1 to 10 rows, a small RowSet is generated each time writing is performed, and when the small RowSets are subsequently merged, more performance of the columnar storage data warehouse is consumed.

In order to avoid the above problem, when a to-be-written data amount is small, data with the small data amount may not be immediately written into the columnar storage data warehouse, but data to be written is batched, and the data is stored by using a columnar storage technology after a data amount corresponding to data to be stored reaches a specific data amount. However, in this manner, for some data, there is a relatively long time delay (for example, the time delay is up to 10 seconds) between data generation and writing of the data into the columnar storage data warehouse. Correspondingly, a time delay between data generation and reading, from the columnar storage data warehouse by another system, of the data is relatively long, so that a requirement for real-time analysis of the data cannot be met. In order to solve the above problem, an embodiment of the present application provides a data processing method and apparatus for a columnar storage data warehouse.

Hereinafter, various non-restrictive embodiments of the present application are described in detail below with reference to the accompanying drawings.

Exemplary Method

Figure 3:
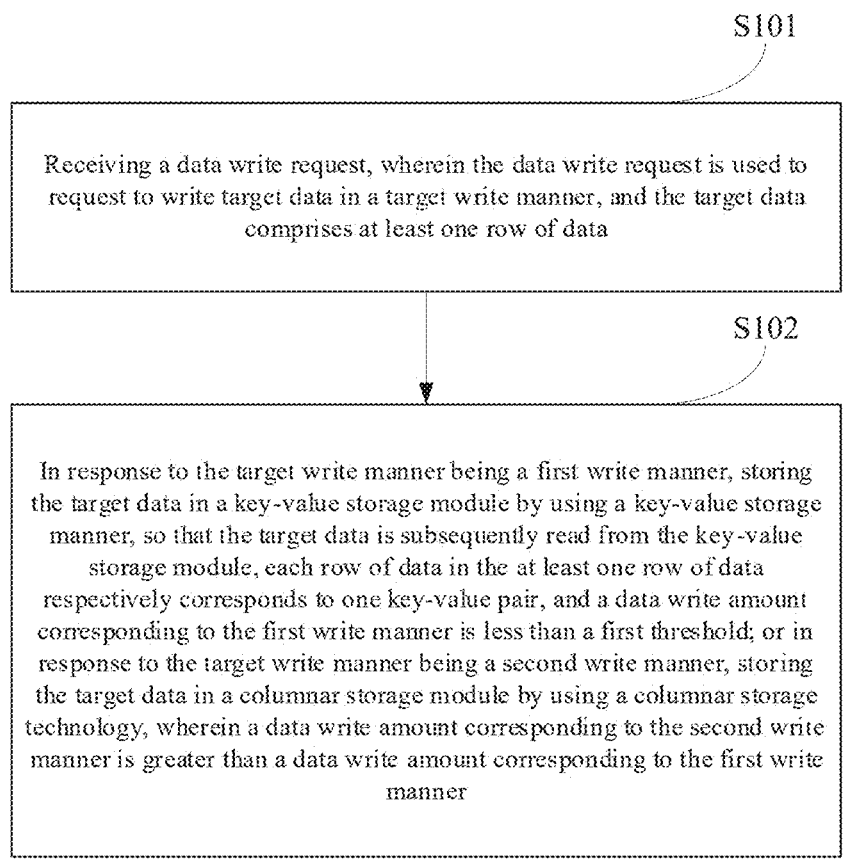
FIG. 3 is a schematic flowchart of a data processing method for a columnar storage data warehouse according to an embodiment of the present application.

FIG. 3 is a schematic flowchart of a data processing method for a columnar storage data warehouse according to an embodiment of the present application. In an example, the data processing method provided in this embodiment of the present application may be applied to a columnar storage data warehouse. As a specific example, when the columnar storage data warehouse includes the structure shown in FIG. 1, the data processing method may be specifically applied to a back-end node of the columnar storage data warehouse.

In this embodiment, the data processing method may include, for example, the following steps: S101 and S102.

S101: receiving a data write request, wherein the data write request is used to request to write target data in a target write manner, and the target data comprises at least one row of data.

In an example, the data write request may be sent by a front-end node to the back-end node. The data write request may specifically be a data write statement. The data write request may indicate a target write manner, and the target write manner is used to indicate a manner of writing the target data. In an example, the target write manner may be determined through the foregoing data write statement.

The target write manner is not specifically limited in this embodiment of the present application, and the target write manner includes but is not limited to: an insert values (Insert Values) manner, a stream load (Stream Load) manner, a broker load (Broker Load) manner, or an insert select (Insert Select) manner.

S102: in response to the target write manner being a first write manner, store the target data in a key-value storage module by using a key-value storage manner, so that the target data is subsequently read from the key-value storage module, each row of data in the at least one row of data respectively corresponds to one key-value pair, and a data write amount corresponding to the first write manner is less than a first threshold; or in response to the target write manner being a second write manner, store the target data in a columnar storage module by using a columnar storage technology, wherein a data write amount corresponding to the second write manner is greater than a data write amount corresponding to the first write manner.

In this embodiment of the present application, it is considered that a data write manner may be associated with a data write amount. In other words, when data is written, a data write manner that matches the data write amount is generally used for writing. Therefore, how to store the target data may be determined based on the target write manner.

In this embodiment of the present application, a data write amount corresponding to the first write manner is relatively small, specifically, less than the first threshold. The data write amount corresponding to the first write manner is less than the first threshold, for example, the data write amount corresponding to the first write manner is less than M rows, M is a positive integer, for example, M is 100. In an example, considering that a data write amount corresponding to the Insert Values manner is relatively small, the first write manner may be the Insert Values manner. A data write amount corresponding to the second write manner is relatively large, and greater than the data write amount corresponding to the first write manner. In a specific example, the data write amount corresponding to the second write manner is greater than a second threshold. The data write amount corresponding to the second write manner is relatively large, for example, the data write amount corresponding to the second write manner is greater than N rows, N is a positive integer, for example, N is 100,000. In an example, considering that data write amounts corresponding to the Stream Load manner, the Broker Load manner, and the Insert Select manner are relatively large, the second write manner may be the Stream Load manner, the Broker Load manner, or the Insert Select manner.

In this embodiment of the present application, in order to meet a requirement for real-time analysis of the target data, after the data write request is received, if the target write manner is the first write manner corresponding to the relatively small data write amount, the target data is no longer stored by using a columnar storage technology after a data amount corresponding to data to be stored is accumulated to a specific data amount as in the conventional technology, but is directly stored in the key-value storage module by using the key-value storage manner, so that another system (for example, an analysis system) can subsequently read the target data from the key-value storage module. In addition, when the target data is stored in the key-value storage manner, each row of data in the at least one row of data respectively corresponds to one key-value pair.

In an example, for each row of data in the at least one row of data, a key of a key-value pair corresponding to the row of data is used to uniquely identify the row of data, and keys in key-value pairs corresponding to different rows of data are different. Key-value pairs corresponding to the rows of data are described below by using a target row in the at least one row of data as an example, where the target row is any one of the at least one row of data.

As an example, a key of a key-value pair corresponding to the target row may include three elements: an identifier of a data storage unit to which the target row belongs, a batch identifier corresponding to the target row, and a row identifier of the target row. The following describes the three elements:

The data storage unit is a smallest data management unit corresponding to the key-value storage module. In an example, the smallest data management unit corresponding to the key-value storage module and the smallest data management unit corresponding to the foregoing columnar storage data warehouse may be the same. For example, both the smallest data management units are tablets.

The batch identifier corresponding to the target row is used to identify a batch in which the target data is written into the key-value storage module. In some scenarios, a batch mentioned in this embodiment of the present application may also be referred to as a version.

In addition, the key of the key-value pair corresponding to the target row may further include a cluster identifier in addition to the foregoing three elements, and the cluster identifier is used to identify a cluster to which the back-end node belongs. In this case, a key of the target row may be: {prefix} _{tablet_id} _{version_id} _{row_id}. In the key, prefix is used to identify the cluster to which the back-end node belongs, tablet_id is the identifier of the data storage unit to which the target row belongs, version_id is the batch identifier corresponding to the target row, and row_id is the identifier of the target row.

Correspondingly, if the target write manner is the second write manner, the target data may be directly stored in the columnar storage module by using the columnar storage technology. The columnar storage technology mentioned here may be a conventional columnar storage technology (for example, a storage technology used by a doris storage data warehouse). Correspondingly, the columnar storage module mentioned here may be a module that stores data by using the conventional columnar storage technology. In other words, the columnar storage module mentioned here may correspond to a conventional doris storage data warehouse. Details are not described herein.

Figure 4:
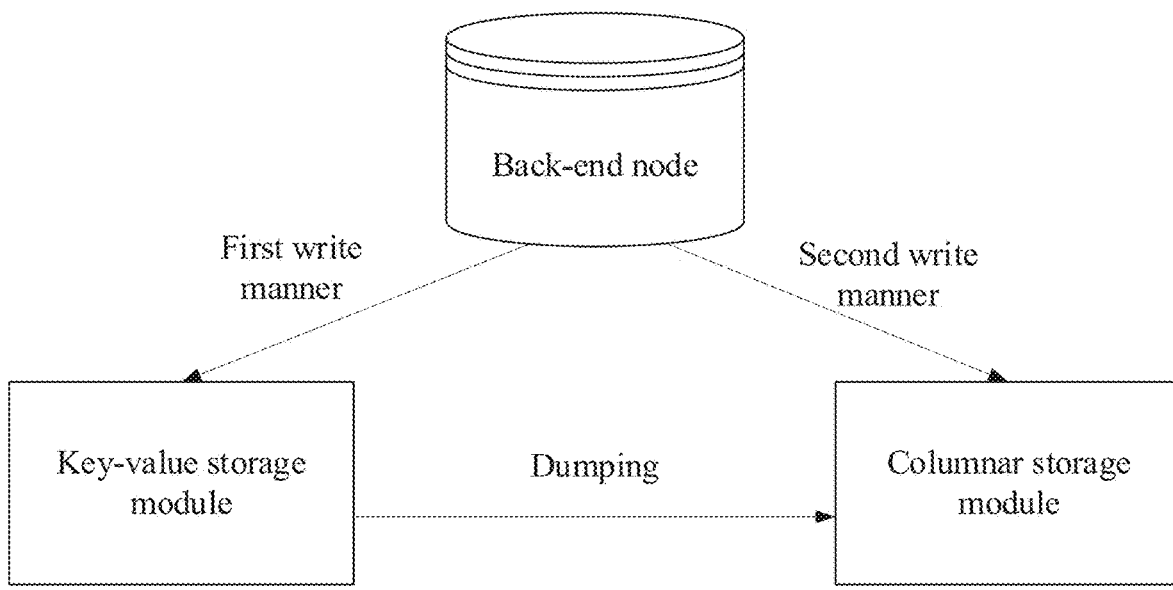
FIG. 4 is a schematic diagram of a data storage method performed by a back-end node according to an embodiment of the present application.

FIG. 4 can be used for understanding. FIG. 4 is a schematic diagram of a data storage method performed by a back-end node according to an embodiment of the present application. As illustrated by FIG. 4, when the target write manner is the first write manner, the back-end node writes the target data in the key-value storage module, and when the target write manner is the second write manner, the back-end node writes the target data in the columnar storage module.

In an example, considering that the key-value storage module is used as a "temporary" storage module and a data amount that can be stored in the key-value storage module is limited, when a data amount stored in the key-value storage module reaches a specific data amount, data stored in the key-value storage module may be transferred to the columnar storage module by using the columnar storage technology. For a specific implementation of transferring the data stored in the key-value storage module to the columnar storage module, refer to related descriptions below. In addition, transferring data in the key-value storage module to the columnar storage module may also be referred to as "dumping".

It can be learned from the foregoing description that according to the solution in this embodiment of the present application, when a data write amount corresponding to the target data is relatively small, the target data is stored in the key-value storage module in a timely manner by using the key-value storage manner, and accordingly, another system (for example, an analysis system) can also read the target data from the key-value storage module in a timely manner, so that a requirement for real-time analysis of the target data is met.

Next, a specific implementation of storing the target data in the key-value storage module by using the key-value storage manner is described.

In a specific example, considering that at a same moment, a plurality of back-end nodes may need to write data in the key-value storage module. If the plurality of back-end nodes simultaneously write data in the key-value storage module, a write conflict occurs. In order to avoid this problem, a data lock is introduced in this embodiment of the present application. Before data is written in the key-value storage module, the data lock may be obtained, and the data lock is locked. For a specific back-end node, the back-end node locks the data lock, to obtain a permission to write data in the key-value storage module, and another back-end node cannot write data in the key-value storage module, so that a plurality of back-end nodes are prevented from simultaneously writing data in the key-value storage module.

With regard to the data lock, it is to be noted that, in an example, the data lock may be a field, for example, the data lock may correspond to a lock field, and a value of the field indicates whether the data lock is locked. For example, if a value of the lock field is 0, it indicates that the data lock is not locked, and if the value of the lock field is 1, it indicates that the data lock is locked.

Figure 5:
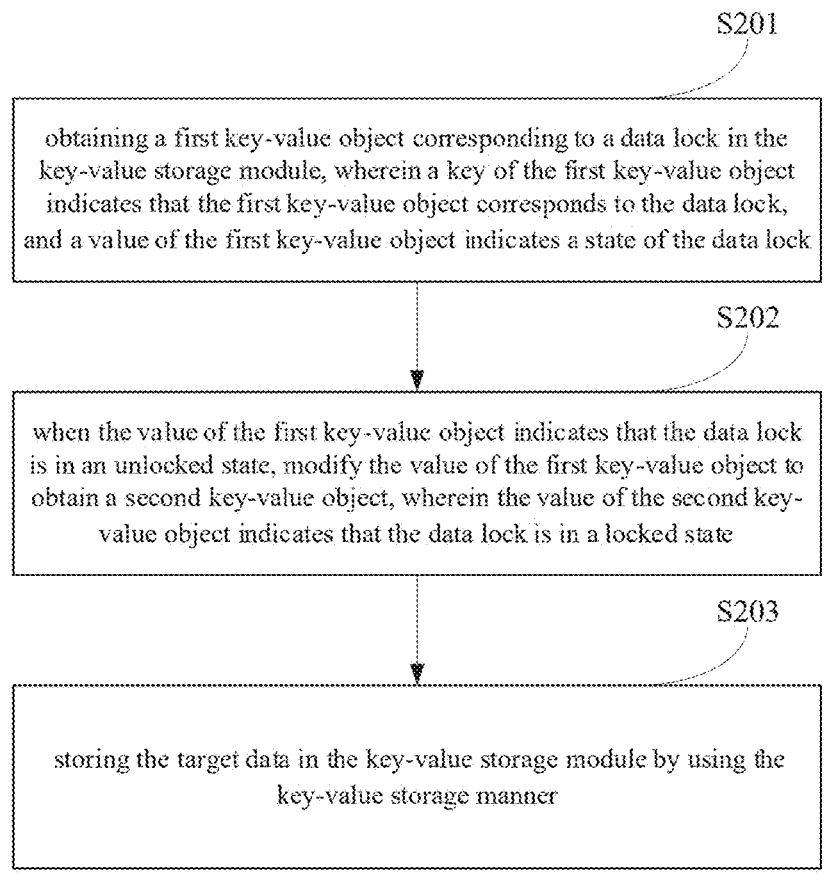
FIG. 5 is a schematic flowchart of a method for storing target data in a key-value storage module according to an embodiment of the present application.

In another example, the data lock may correspond to one key-value object. A key of the key-value object indicates that the key-value object corresponds to the data lock, and a value of the key-value object may indicate a state of the data lock. The state of the data lock mentioned here may be a locked state or an unlocked state. In this case, when "storing the target data in the key-value storage module by using the key-value storage manner" is specifically implemented, the implementation may include S201 to S203 shown in FIG. 5. FIG. 5 is a schematic flowchart of a method for storing target data in a key-value storage module according to an embodiment of the present application.

S201: obtaining a first key-value object corresponding to a data lock in the key-value storage module, wherein a key of the first key-value object indicates that the first key-value object corresponds to the data lock, and a value of the first key-value object indicates a state of the data lock.

In an example, the key-value storage module may include a plurality of data storage units, and each data storage unit may correspond to one data lock. In a specific example, if target data needs to be written in a first data storage unit in the key-value storage module, the data lock mentioned in S201 may be a data lock corresponding to the first data storage unit. The data lock corresponding to the first data storage unit is used to prevent a plurality of back-end nodes from simultaneously writing data in the first data storage unit.

With regard to the first key-value object, it is to be noted that, in an example, the key of the first key-value object may be used to identify that the first key-value object corresponds to the data lock. When the data lock is a data lock corresponding to the first data storage unit, the key of the first key-value object may indicate that the first key-value object corresponds to the data lock corresponding to the first data storage unit. In this case, the key of the first key-value object may include an identifier of the first data storage unit and a lock identifier. Certainly, the key of the first key-value object may further include a cluster identifier to which the back-end node belongs. For example, the key of the first key-value object may be: {prefix}_{tablet_id}_lock. In the key, prefix is used to identify the cluster to which the back-end node belongs, tablet_id is the identifier of the first data storage unit, and lock is the lock identifier.

The value of the first key-value object is used to indicate the state of the data lock. In an example, in order to facilitate the back-end node to write the target data in the first data storage unit, in addition to indicating the state of the data lock, the value of the first key-value object may further be used to indicate a first row number of data that has been stored in the first data storage unit. The first row number mentioned here indicates a largest row number of data that has been stored in the first data storage unit. For example, if data is stored in rows 1 to 9 of the first data storage unit, the first row number may be 9. In an example, the key of the first key-value object may be, for example: Commit RowID, indicating that the data lock is in an unlocked state and a row number of currently stored data is RowID.

S202: when the value of the first key-value object indicates that the data lock is in an unlocked state, modify the value of the first key-value object to obtain a second key-value object, wherein the value of the second key-value object indicates that the data lock is in a locked state.

If the value of the first key-value object indicates that the data lock is in the unlocked state, it indicates that no other back-end node currently writes data in the first data storage unit. In this case, the data lock may be locked. Specifically, the value of the first key-value object may be modified to obtain the second key-value object, and the value of the second key-value object indicates that the data lock is in the locked state. In a specific example, in addition to reflecting the first row number of data that has been stored in the first data storage unit, the modified second key-value object may further reflect a second row number of data stored in the first data storage unit after the target data is stored in the first data storage unit. In this way, a position of the currently written target data in the first data storage unit can be determined based on the second key-value object. It should be noted that if the target data includes m rows, the second row number may be equal to the first row number plus m.

The first key-value object and the second key-value object are described below with reference to Table 1.

TABLE 1

| First key-value object | Key: {prefix}_{tablet_id}_lock | Description: Unlocked, and |

TABLE 1-continued

| | | | |
|---|---|---|---|
| Second key-value object | | Value: Commit RowID Key: {prefix}_{tablet_id}_lock Value: Commit RowID;Prewrite NextRowID | RowID is the first row number Description: Locked, RowID is the first row number, and NextRowID is the second row number |

S203: storing the target data in the key-value storage module by using the key-value storage manner.

After the value of the first key-value object is modified to obtain the second key-value object, the data lock is locked. Further, after the data lock is locked, the target data may be stored in the key-value storage module by using the key-value storage manner. In a specific example, the target data may be stored in the first data storage unit in the key-value storage module by using the key-value storage manner.

In an example, after S203 is performed, the foregoing data lock may be further unlocked, so that data is subsequently written in the first data storage unit. Specifically, the value of the second key-value object may be modified to obtain a third key-value object, where the value of the third key-value object indicates that the data lock is in an unlocked state and the second row number of data that has been stored in the first data storage unit. It is not difficult to understand that a difference between the third key-value object and the first key-value object is that a row number of data that has been stored in the first data storage unit indicated by the value of the third key-value object is the second row number, and a row number of data that has been stored in the first data storage unit indicated by the value of the first key-value object is the first row number.

Next, the key-value object corresponding to the data lock is described below with reference to Table 2.

TABLE 2

| | | | |
|---|---|---|---|
| Before the target data is written | First key-value object | Key: {prefix}_{tablet_id}_lock Value: Commit RowID | Description: Unlocked, and RowID is the first row number |
| During the target data writing | Second key-value object | Key: {prefix}_{tablet_id}_lock Value: Commit RowID;Prewrite NextRowID | Description: Locked, RowID is the first row number, and NextRowID is the second row number |
| After the target data is written | Third key-value object | Key: {prefix}_{tablet_id}_lock Value: Commit NextRowID | Description: Unlocked, and NextRowID is the second row number |

As illustrated by Table 2, before the target data is written, the data lock corresponds to the first key-value object. Because the value of the first key-value object indicates that the data lock is in the unlocked state, the back-end node can lock the data lock to obtain the second key-value object, and start to write the target data. In other words, during target data writing, the data lock corresponds to the second key-value object. After the target data is written, the back-end node can unlock the data lock to obtain the third key-value object.

In an example, if a time during which the data lock is locked is too long, it indicates that a target data writing process may be abnormal. In this case, in an example, the back-end node may modify the second key-value object to the first key-value object. As an example, when the data lock is in the locked state, the back-end node may periodically query the state of the data lock to determine whether the time during which the data lock is locked is too long. The abnormal target data writing process may include two cases: one case is that data is not written, and the other case is that data is written but not committed.

As mentioned above, the key-value storage module is used as a "temporary" storage module, and a data amount that can be stored in the key-value storage module is limited. Therefore, when a data amount stored in the key-value storage module reaches a specific data amount, data stored in the key-value storage module may be transferred to the columnar storage module by using the columnar storage technology. For example, data stored in the key-value storage module may be transferred to the columnar storage module at regular intervals. As a specific example, data stored in the first data storage unit may be transferred to the columnar storage module by using the columnar storage technology. The first data storage unit may include at least one batch of written data, and the target data may be data written in one of the at least one batch.

In an example, all data that is currently stored in the first data storage unit may be obtained, and the obtained all data is stored in the columnar storage module by using the columnar storage technology. In this process, writing new data in the first data storage unit may be prohibited.

In another example, it is considered that the key-value storage module is used to meet a requirement for real-time analysis of data. Therefore, when data in the first data storage unit is stored in the columnar storage module, writing new data in the first data storage unit should not be prohibited. In order to achieve this objective, when "storing, by using a columnar storage technology, data stored in the first data storage unit in a columnar storage module" is specifically implemented, the implementation may include the following steps A1 and A2.

A1: obtaining first version information corresponding to the first data storage unit, wherein the first version information indicates a first batch corresponding to data that has been written in the first data storage unit and a second batch that is currently used for writing data.

In an example, the first data unit may have corresponding version information, and the version information is used to indicate data write batches corresponding to the first data unit and a state of data corresponding to each batch. In an example, the foregoing version information may be obtained through a key-value object corresponding to a version.

In an example, a key of the key-value object corresponding to the version may be used to identify that the key-value object corresponds to the version. In an example, the key of the key-value object corresponding to the version may include an identifier of the first data storage unit and a version identifier. Certainly, the key of the key-value object corresponding to the version may further include a cluster identifier to which the back-end node belongs. For example, the key of the key-value object corresponding to the version may be: {prefix} _{tablet_id} _version. In the key, prefix is used to identify the cluster to which the back-end node belongs, tablet_id is the identifier of the first data storage unit, and version is the version identifier.

In an example, the value of the key-value object corresponding to the version may carry the foregoing version information.

In an example, when the first version information is obtained, for example, a fourth key-value object corresponding to the first version information may be obtained, and the value of the fourth key-value object includes the first version information. The first version information indicates a first batch corresponding to data that has been written in the first data storage unit and a second batch that is currently used for writing data. The first batch may include one batch or a plurality of batches. An example of the value of the fourth key-value object is as follows:

The value of the fourth key-value object may be, for example: {<version1, commit id1>, <version2, commit id2>, version3}, where <version1, commit id1> indicates that data in batch 1 has been written, and commit id1 indicates a largest row number of data written in batch 1. <version2, commit id2> indicates that data in batch 2 has been written, and commit id2 indicates a largest row number of data written in batch 2. version3 indicates that batch 3 is currently used to write data in the first data storage unit. In this case, both batch 1 and batch 2 are the first batch, and batch 3 is the second batch.

Alternatively, the value of the fourth key-value object may be, for example: {<version1, commit id1>, <version2, commit id2>, version2}, where <version1, commit id1> indicates that data in batch 1 has been written, and commit id1 indicates a largest row number of data written in batch 1. version2 indicates that batch 2 is currently used to write data in the first data storage unit. In this case, batch 1 is the first batch, and batch 2 is the second batch.

The first version information may be generated by the back-end node before step A1 is performed. For a generation manner of the first version information, refer to a description part of steps B1 to B3 below, and details are not described herein.

A2: reading, from the first data storage unit, data corresponding to the first batch, and store, by using a columnar storage technology, the data corresponding to the first batch in the columnar storage module.

After the first version information is obtained, because data corresponding to the first batch has been written, in other words, the first batch cannot be used to continue to write data, and the batch currently used for writing data is the second batch. Therefore, data corresponding to the first batch may be read from the first data storage unit, and the data corresponding to the first batch is stored in the columnar storage module by using the columnar storage technology. In this way, data corresponding to the first batch can be dumped in the columnar storage module, and writing data in the key-value storage module based on the second batch is not affected.

In an example, when the first batch includes a plurality of batches, data corresponding to the plurality of batches may be written in the columnar storage module in a parallel writing manner. For example, data corresponding to each batch is written in a new RowSet.

In this embodiment of the present application, an existing data storage mechanism of the columnar storage data warehouse may be used to store data corresponding to the first batch in the columnar storage module. Details of the existing data storage mechanism of the columnar storage data warehouse are not described herein.

In an example, before step A2 is performed, the value of the foregoing fourth key-value object may be modified to obtain a fifth key-value object, and the value of the fifth key-value object indicates that data corresponding to the first batch is in a dumping state. In this way, a state of data corresponding to the current first batch can be determined based on the value of the fifth key-value object, so that the first key-value object is managed based on the state. For example, when the state of the data corresponding to the first batch is the dumping state, a modify or delete operation is prohibited from being performed on the data corresponding to the first batch.

Correspondingly, after the data corresponding to the first batch is successfully stored in the columnar storage module in step A2, the value of the foregoing fifth key-value object may be further modified to obtain a sixth key-value object, and the value of the sixth key-value object indicates that the data corresponding to the first batch has been successfully stored in the columnar storage module. In this way, a state of data corresponding to the current first batch can be determined based on the value of the sixth key-value object, so that the first key-value object is managed based on the state. In a specific example, the data corresponding to the first batch may be deleted from the key-value storage module based on the value of the sixth key-value object, so that data corresponding to the foregoing first batch is prevented from being repeatedly stored in the key-value storage module and the columnar storage module. Deleting the data corresponding to the first batch from the key-value storage module can also release a storage space in the key-value storage module, so that the storage space is used to continue to store other data.

The foregoing fourth key-value object, fifth key-value object, and sixth key-value object are described below with reference to the following Table 3.

TABLE 3

| | Key: | Description: |
|---|---|---|
| Fourth key-value object | Key: {prefix}_{tablet_id}_version Value: { <version1, commit id1>, <version2, commit id2>, version3} | Description: Data in batch 1 and batch 2 has been written, and batch 3 is currently used to write data in the first data storage unit |
| Fifth key-value object | Key: {prefix}_{tablet_id}_version Value: { write<version1, commit id1>, write <version2, commit id2>, version3} | Description: Data in batch 1 and batch 2 is in the dumping state |
| Sixth key-value object | Key: {prefix}_{tablet_id}_version Value: {commit<version1, commit id1>, commit <version2, commit id2>, version3} | Description: Data in batch 1 and batch 2 has been successfully stored in the columnar storage module |

In an example, the fifth key-value object may be further locked. After a specific back-end node locks the fifth key-value object, another back-end node cannot store data corresponding to the first batch in the columnar storage module based on the fifth key-value object, so that a plurality of back-end nodes are prevented from simultaneously performing a dumping operation on data corresponding to the first batch. It should be noted that if the fifth key-value object is locked, a sixth key-value object obtained by modifying the value of the fifth key-value object is also in a locked state. Correspondingly, after the data corresponding to the first batch is deleted from the key-value storage module, the sixth key-value object may be unlocked.

In an example, if writing data corresponding to the first batch in the columnar storage module fails, the foregoing fifth key-value object may be modified to the foregoing fourth key-value object, so that an attempt is subsequently made again, based on the fourth key-value object, to write the data corresponding to the foregoing first batch in the columnar storage module.

Next, a generation manner of the first version information is described with reference to steps B1 to B3.

B1: obtaining second version information corresponding to the first data storage unit, wherein the second version information indicates the first batch corresponding to data that has already been included in the first data storage unit.

In an example, a seventh key-value object may be obtained, and a value of the key-value object includes the second version information. The first batch corresponding to data that has already been included in the first data storage unit mentioned here may include a written batch and/or an unwritten batch. For example, the value of the seventh key-value object may be: {<version1, commit id1>, version2>}, in this case, version1 is the written batch 1, and commit id1 indicates a largest row number of data written in batch 1, version2 is the unwritten batch 2, and the first batch includes batch 1 and batch 2. For another example, the value of the seventh key-value object may be: {version1}, in this case, version1 is the unwritten batch 1, and the first batch may include batch 1. For another example, the value of the seventh key-value object may be: {<version1, commit id1>}, in this case, version1 is the written batch 1, and commit id1 indicates a largest row number of data written in batch 1, and the first batch may include batch 1.

B2: generating, based on the first batch, a second batch that is used to continue to write data in the key-value storage module in the first data storage unit.

In an example, the second batch whose batch number is greater than a largest batch number in the first batch may be generated based on the first batch. For example, if the first batch includes batch 1 and batch 2, a generated batch number of the second batch may be 3, that is, the second batch may be batch 3.

B3: obtaining the first version information based on the second version information and the second batch.

As mentioned above, the second version information includes the written batch and/or the unwritten batch. In an example, if the second version information includes the written batch but does not include the unwritten batch, when step B3 is specifically implemented, an identifier of the second batch may be added to the second version information, to obtain the first version information. An example is as follows:

The second version information is: {<version1, commit id1>}, and an identifier of the generated second batch is version2. In this case, the first version information may be {<version1, commit id1>, version2}.

For example, the value of the seventh key-value object may be: {<version1, commit id1>, version2>}, in this case, version1 is the written batch 1, and commit id1 indicates a largest row number of data written in batch 1, version2 is the unwritten batch 2, and the first batch includes batch 1 and batch 2. For another example, the value of the seventh key-value object may be: {version1}, in this case, version1 is the unwritten batch 1, and the first batch may include batch 1. For another example, the value of the seventh key-value object may be: {<version1, commit id1>}, in this case, version1 is the written batch 1, and commit id1 indicates a largest row number of data written in batch 1, and the first batch may include batch 1.

In an example, if the second version information includes the unwritten batch, when step B3 is specifically implemented, a largest row number of data that has already been written in the unwritten batch may be obtained, and the identifier of the second batch and the largest row number are added to the second version information, to obtain the first version information. An example is as follows:

For example, the second version information is: {<version1, commit id1>, version2}, a largest row number of data that has already been written in the batch corresponding to version2 is commit id2, and an identifier of the generated second batch is version3. In this case, the first version information may be {<version1, commit id1>, <version2, commit id2>, version3}.

For another example, the second version information is: {version1}, a largest row number of data that has already been written in the batch corresponding to version1 is commit id1, and an identifier of the generated second batch is version2. In this case, the first version information may be {<version1, commit id1>, version2}.

After the first version information is obtained, the value of the foregoing seventh key-value object may be modified to the first version information, to obtain the foregoing fourth key-value object.

In an example, before step B2 is performed, or between step B1 and step B2, a data lock of the first data storage unit may be further obtained, and the data lock is locked. For example, a state indicated by a value of a key-value object corresponding to the data lock is modified to a locked state. In this way, another back-end node cannot write data in the first data storage unit. Correspondingly, the obtained second version information can be consistent with data currently stored in the first data storage unit. Correspondingly, after step B3 is performed, the data lock of the first data storage unit may be unlocked, so that the back-end node can use the second batch to continue to write data in the first data storage unit. For the key-value object corresponding to the data lock, refer to the related description part of the first key-value object, the second key-value object, and the third key-value object above, and details are not described herein again.

Figure 6:
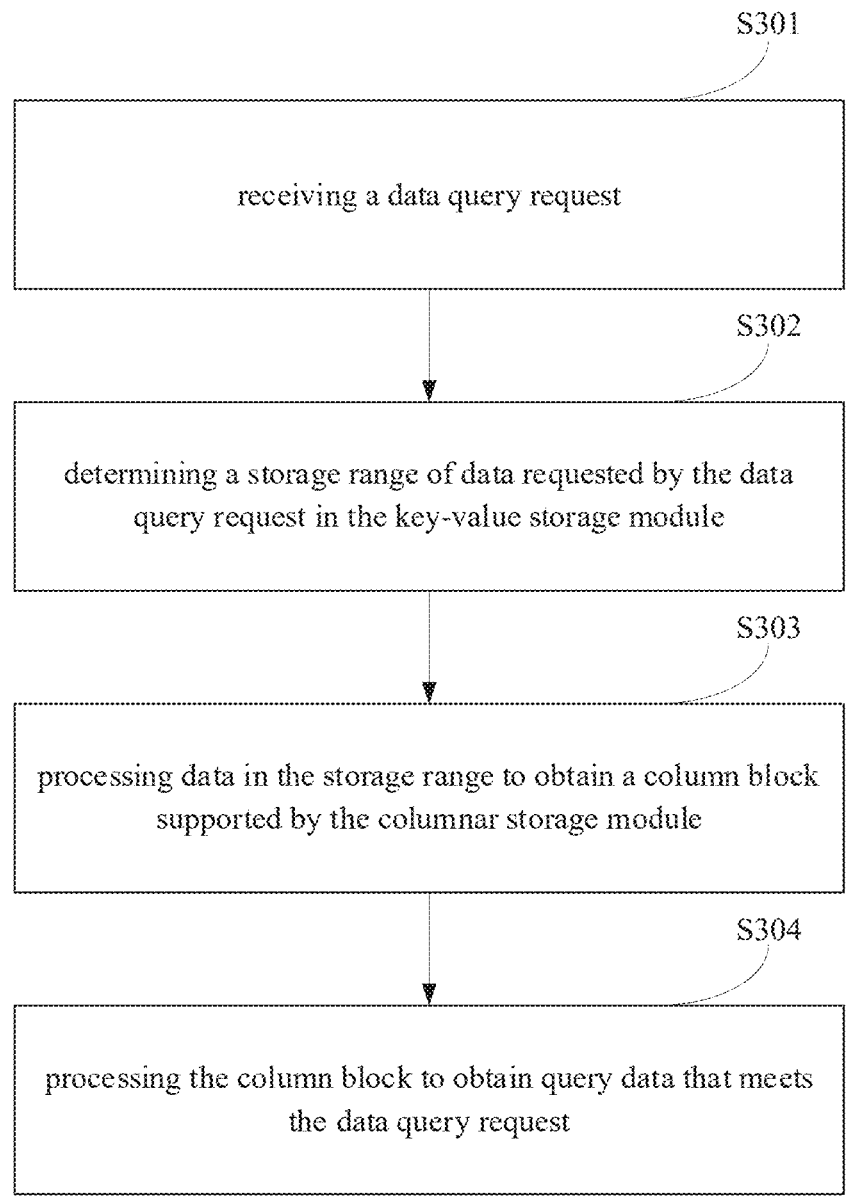
FIG. 6 is a schematic flowchart of a data query method according to an embodiment of the present application.

Next, a data query method provided in this embodiment of the present application is described with reference to FIG. 6. FIG. 6 is a schematic flowchart of a data query method according to an embodiment of the present application. The data processing method shown in FIG. 6 may include the following S301 to S304.

S301: receiving a data query request.

In an example, the data query request may be an SQL statement.

In an example, when S301 is specifically implemented, the data query request sent by a client may be received. The client and the columnar storage data warehouse including the columnar storage module and the key-value storage module may communicate through, for example, a MySQL protocol. When the columnar storage data warehouse includes the structure shown in FIG. 1, the data query request sent by the client may be received by the front-end node.

In an example, the data query request may include a data storage unit identifier, and the data storage unit identifier is used to indicate a data storage unit where data requested by the data query request is located. For example, the data storage unit identifier may be the identifier of the foregoing first data storage unit.

In this embodiment of the present application, after the data query request is received, query data that meets the data query request may be preferentially queried from the key-value storage module, or query data that meets the data query request may be queried from both the key-value storage module and the columnar storage module.

Next, how to query the query data from the key-value storage module is described with reference to S302 to S304. Querying the query data from the columnar storage module may follow a conventional query logic of the columnar storage data warehouse, for example, a conventional query logic of the doris storage data warehouse. Details are not described herein.

S302: determining a storage range of data requested by the data query request in the key-value storage module.

In an example, a storage range corresponding to all data stored in the key-value storage module may be determined as the storage range of the data requested by the data query request in the key-value storage module.

In another example, when the data query request includes the data storage unit identifier, the storage range may be a range of data stored in a data storage unit identified by the data storage unit identifier. The storage range may include a start position and an end position. In an example, both the start position and the end position may be represented by three elements, namely, a data storage unit identifier, batch information, and a row number. For example, the determined storage range may be as follows:

Start position: {tablet1} _{version1} _row1;
End position: {tablet1} _{version10} _row100.

In other words, the determined storage position is from a first row of batch 1 of tablet1 to a 100th row of batch 10 of tablet1.

In this case, when S302 is specifically implemented, the implementation may include the following steps C1 and C2.

Step C1: Determine a target batch of data stored in a data storage unit identified by the data storage unit identifier, and determine a third row number of data stored in a largest batch in the target batch, where a row corresponding to the third row number is a last row of the largest batch.

Step C2: Determine the storage range based on the target batch and the third row number, where the storage range is from a first row of a smallest batch in the target batch to the last row of the largest batch.

For ease of description, a "data storage unit to which data requested by the data query request belongs" is referred to as a "second data storage unit". The second data storage unit and the first data storage unit may be a same data storage unit, or may be different data storage units. This is not specifically limited in this embodiment of the present application.

In this embodiment of the present application, a principle of data storage and data reading processes performed by the back-end node for each data storage unit is the same. As described above, the first data storage unit has the key-value object corresponding to the version, and therefore the second data storage unit also has the key-value object corresponding to the version. In this embodiment of the present application, the key-value object corresponding to the version of the second data storage unit may be obtained, to determine a target batch of data stored in the second data storage unit based on the key-value object. The target batch mentioned here includes at least a smallest batch and a largest batch of data stored in the second data storage unit. For example, the target batch may include all batches (for example, batch 1 to batch 10) of data stored in the second data storage unit.

After the smallest batch is determined, the foregoing start position, that is, the first row of the smallest batch, may be obtained. The first row of the smallest batch refers to a first row of data written in the smallest batch, and the first row may alternatively be a first row in the second data storage unit.

Further, after the largest batch is determined, a last row of the largest batch may be further determined, to determine the foregoing end position.

As described above, the first data storage unit has the data lock, and therefore the second data storage unit also has the data lock. As described above for the key-value object corresponding to the data lock, it may be learned that the data lock may include a row number of data that has currently been written in the data storage unit. Therefore, the key-value object corresponding to the data lock of the second data storage unit may be obtained, to determine a third row number of data stored in the largest batch in the target batch. The third row number is used to identify a last row of data written in the largest batch. After the third row number is obtained, the foregoing end position, that is, the last row of the largest batch, may be determined. The last row of the largest batch refers to a last row of data written in the largest batch.

S303: processing data in the storage range to obtain a column block supported by the columnar storage module.

S304: processing the column block to obtain query data that meets the data query request.

After the storage range is determined, query data that meets the data query request may be obtained in a manner in which the columnar storage module queries data. Specifically, deserialization processing may be performed on data in the storage range to obtain a column block supported by the columnar storage module. The column block mentioned here may be a memory structure supported by the columnar storage module. After the column block is obtained, the column block may be processed to obtain query data that meets the data query request.

How to deserialize the foregoing data to obtain the column block and how to obtain the query data based on the column block may follow an existing query processing logic (for example, a query logic of the doris storage data warehouse) of the conventional columnar storage data warehouse. Details are not described herein.

Exemplary Apparatus

Based on the data processing method provided in the foregoing embodiments, this embodiment of the present application further provides an apparatus. The data processing apparatus is described below with reference to the accompanying drawings.

Figure 7:
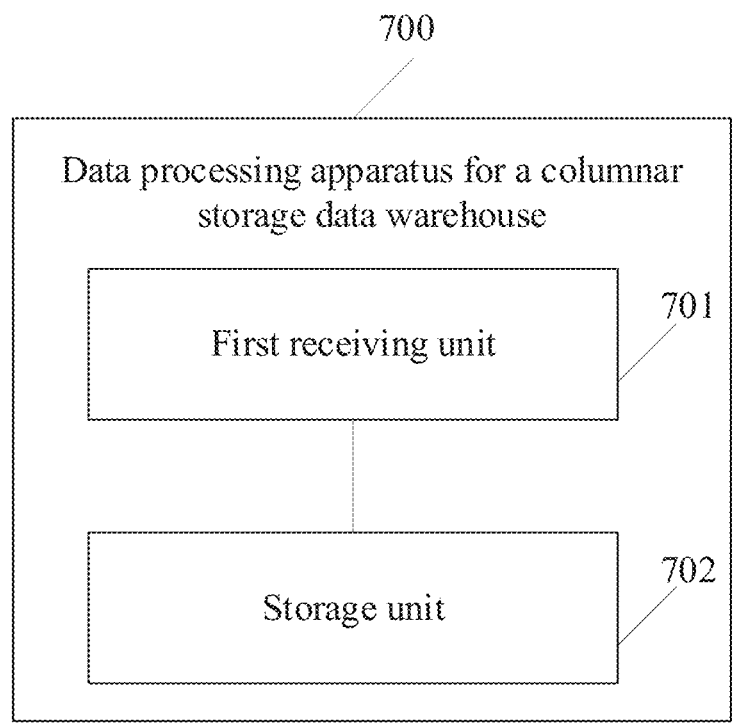
FIG. 7 is a schematic diagram of a structure of a data processing apparatus for a columnar storage data warehouse according to an embodiment of the present application.

FIG. 7 is a schematic structural diagram of an apparatus for data processing in a columnar storage data warehouse according to an embodiment of the present application. For example, the data processing apparatus 700 may specifically include: a first receiving unit 701 and a storage unit 702.

The first receiving unit 701 is configured to receive a data write request, where the data write request is used to request to write target data in a target write manner, and the target data includes at least one row of data.

The storage unit 702 is configured to:
in response to the target write manner being a first write manner, store the target data in a key-value storage module by using a key-value storage manner, so as to subsequently read the target data from the key-value storage module, where each row of data in the at least one row of data respectively corresponds to a key-value pair, and a data write amount corresponding to the first write manner is less than a first threshold; or,
in response to the target write manner being a second write manner, store the target data in a columnar storage module by using a columnar storage technology, where a data write amount corresponding to the second write manner is greater than a data write amount corresponding to the first write manner.

Optionally, the storing the target data in the key-value storage module by using the key-value storage manner includes:

obtaining a first key-value object corresponding to a data lock in the key-value storage module, wherein a key of the first key-value object indicates that the first key-value object corresponds to the data lock, and a value of the first key-value object indicates a state of the data lock;

when the value of the first key-value object indicates that the data lock is in an unlocked state, modifying the value of the first key-value object to obtain a second key-value object, wherein the value of the second key-value object indicates that the data lock is in a locked state; and storing the target data in the key-value storage module by using the key-value storage manner.

Optionally, the key of the first key-value object indicates a data lock of a first data storage unit corresponding to the first key-value object, and the value of the first key-value object further indicates a first row number of data that has been stored in the first data storage unit; and the storing the target data in the key-value storage module by using the key-value storage manner includes:

storing the target data in the first data storage unit in the key-value storage module by using the key-value storage manner;

correspondingly, the value of the second key-value object further indicates a second row number of data stored in the first data storage unit after the target data is stored in the first data storage unit.

Optionally, the data processing apparatus further includes:

a first modifying unit, configured to modify the value of the second key-value object to obtain a third key-value object after the target data is stored in the first data storage unit in the key-value storage module by using the key-value storage manner, where the value of the third key-value object indicates that the data lock is in an unlocked state and the second row number of data that has been stored in the first data storage unit.

Optionally, the data processing apparatus further includes:

a dumping unit, configured to store, by using a columnar storage technology, data stored in the first data storage unit in a columnar storage module, where the first data storage unit includes at least one batch of written data, and the at least one batch of written data includes the target data.

Optionally, the dumping unit is configured to:

obtain first version information corresponding to the first data storage unit, wherein the first version information indicates a first batch corresponding to data that has been written in the first data storage unit and a second batch that is currently used for writing data; and read, from the first data storage unit, data corresponding to the first batch, and store, by using a columnar storage technology, the data corresponding to the first batch in the columnar storage module.

Optionally, the data processing apparatus further includes a second modifying unit and a third modifying unit;

the second modifying unit is configured to modify a value of a fourth key-value object carrying the first version information to obtain a fifth key-value object before data corresponding to the first batch is read from the first data storage unit and stored in the columnar storage module by using the columnar storage technology, where the value of the fifth key-value object indicates that the data corresponding to the first batch is in a dumping state; and the third modifying unit is configured to: after the data corresponding to the first batch is stored in the columnar storage module by using the columnar storage technology, modify the value of the fifth key-value object to obtain a sixth key-value object, where the value of the sixth key-value object indicates that the data corresponding to the first batch has been successfully stored in the columnar storage module.

Optionally, the data processing apparatus further includes:

a deleting unit, configured to delete, based on the value of the sixth key-value object, the data corresponding to the first batch from the key-value storage module.

Optionally, the first version information is generated in the following manner:

obtaining second version information corresponding to the first data storage unit, where the second version information indicates the first batch corresponding to data that has already been included in the first data storage unit;

generating, based on the first batch, a second batch that is used to continue to write data in the first data storage unit; and obtaining the first version information based on the second version information and the second batch.

Optionally, the data processing apparatus further includes: an obtaining unit and an unlocking unit;

the obtaining unit is configured to: before the second batch that is used to continue to write data in the key-value storage module is generated, obtain a data lock of the first data storage unit, and lock the data lock; and the unlocking unit is configured to: after the first version information is obtained, unlock the data lock of the first data storage unit.

Optionally, the data processing apparatus further includes:

a second receiving unit, configured to receive a data query request;

a determining unit, configured to determine a storage range of data requested by the data query request in the key-value storage module;

a processing unit, configured to process data in the storage range to obtain a column block supported by the columnar storage module; and a querying unit, configured to process the column block to obtain query data that meets the data query request.

Optionally, the data query request includes a data storage unit identifier, and the data storage unit identifier is used to identify a data storage unit to which data requested by the data query request belongs. The determining unit is configured to:

determine a target batch of data stored in a data storage unit identified by the data storage unit identifier, and determine a third row number of data stored in a largest batch in the target batch, where a row corresponding to the third row number is a last row of the largest batch; and determine the storage range based on the target batch and the third row number, where the storage range is from a first row of a smallest batch in the target batch to the last row of the largest batch.

Because the data processing apparatus 700 is an apparatus corresponding to the data processing method for data processing in a columnar storage data warehouse provided in the foregoing method embodiments, a specific implementation of each unit of the data processing apparatus 700 is the same as that of the foregoing method embodiments. Therefore, for the specific implementation of each unit of the data processing apparatus 700, reference may be made to the related description part of the foregoing method embodiments, and details are not described herein again.

An embodiment of the present application further provides an electronic device. The electronic device includes a processor and a memory.

The processor is configured to execute instructions stored in the memory, to enable the device to perform the data processing method for data processing in a columnar storage data warehouse provided in the foregoing method embodiments.

An embodiment of the present application provides a computer-readable storage medium, including instructions, where the instructions instruct a device to perform the data processing method for data processing in a columnar storage data warehouse provided in the foregoing method embodiments.

An embodiment of the present application further provides a computer program product that, when running on a computer, causes the computer to perform the data processing method for data processing in a columnar storage data warehouse provided in the foregoing method embodiments.

Persons skilled in the art may readily figure out other implementation solutions of the present application after considering the specification and practicing the invention disclosed herein. The present application is intended to cover any variations, uses, or adaptations of the present application following the general principles of the present application and including common knowledge or conventional technical means in the art that are not disclosed in the present disclosure. The specification and embodiments are merely considered as examples, and the true scope and spirit of the present application are defined by the appended claims.

It should be understood that the present application is not limited to the precise structures that have been described above and shown in the accompanying drawings, and various modifications and changes may be made without departing from the scope thereof. The scope of the present application is defined only by the appended claims.

The foregoing descriptions are merely preferred embodiments of the present application, but are not intended to limit the present application. Any modification, equivalent replacement, or improvement made within the spirit and principle of the present application shall fall within the scope of protection of the present application.

The invention claimed is:

1. A data processing method for a columnar storage data warehouse, wherein the columnar storage data warehouse is divided to comprise a key-value storage module and a columnar storage module, and the data processing method comprises:
    receiving a data write request, wherein the data write request is used to request to write target data in a target write manner, and the target data comprises at least one row of data;
    in response to the target write manner being a first write manner, writing, by using a key-value storage manner, the target data into the key-value storage module for storage, so that the target data is subsequently read from the key-value storage module, each row of data in the at least one row of data respectively corresponds to one key-value pair, and a data write amount corresponding to the first write manner is less than a first threshold;
    or,
    in response to the target write manner being a second write manner, writing, by using a columnar storage technology, the target data into the columnar storage module for storage, wherein a data write amount corresponding to the second write manner is greater than the data write amount corresponding to the first write manner;
    wherein the writing, by using the key-value storage manner, the target data into the key-value storage module for storage comprises:
        obtaining a first key-value object corresponding to a data lock in the key-value storage module, wherein a key of the first key-value object indicates that the first key-value object corresponds to the data lock, and a value of the first key-value object indicates a state of the data lock;
        in response to the value of the first key-value object indicating that the data lock is in an unlocked state, modifying the value of the first key-value object to obtain a second key-value object, wherein a value of the second key-value object indicates that the data lock is in a locked state; and
        writing, by using the key-value storage manner, the target data into the key-value storage module for storage;
    wherein the key of the first key-value object indicates that the first key-value object corresponds to a data lock of a first data storage unit, and the value of the first key-value object further indicates a first row number of data that has been stored in the first data storage unit;
    wherein the writing, by using the key-value storage manner, the target data into the key-value storage module for storage comprises writing the target data into the first data storage unit in the key-value storage module by using the key-value storage manner; and
    wherein the value of the second key-value object further indicates a second row number of data stored in the first data storage unit after the target data is written into the first data storage unit.

2. The data processing method according to claim 1, wherein after the writing the target data into the first data storage unit in the key-value storage module by using the key-value storage manner, the data processing method further comprises:
    modifying the value of the second key-value object to obtain a third key-value object, wherein a value of the third key-value object indicates that the data lock is in the unlocked state and the second row number of data that has been stored in the first data storage unit.

3. The data processing method according to claim 1, wherein the data processing method further comprises:
    storing, by using the columnar storage technology, data stored in the first data storage unit in the columnar storage module, wherein the first data storage unit includes at least one batch of written data, and the at least one batch of written data comprises the target data.

4. The data processing method according to claim 3, wherein the storing, by using the columnar storage technology, data stored in the first data storage unit in the columnar storage module comprises:
    obtaining first version information corresponding to the first data storage unit, wherein the first version information indicates a first batch corresponding to data that has been written in the first data storage unit and a second batch that is currently used for writing data; and reading, from the first data storage unit, data corresponding to the first batch, and storing, by using the columnar storage technology, the data corresponding to the first batch in the columnar storage module.

5. The data processing method according to claim 4, wherein before the reading, from the first data storage unit, data corresponding to the first batch, and storing, by using the columnar storage technology, the data corresponding to the first batch in the columnar storage module, the data processing method further comprises:

modifying a value of a fourth key-value object carrying the first version information to obtain a fifth key-value object, wherein a value of the fifth key-value object indicates that the data corresponding to the first batch is in a dumping state; and after the storing, by using the columnar storage technology, the data corresponding to the first batch in the columnar storage module, the data processing method further comprises:

modifying the value of the fifth key-value object to obtain a sixth key-value object, wherein a value of the sixth key-value object indicates that the data corresponding to the first batch has been successfully stored in the columnar storage module.

6. The data processing method according to claim 5, wherein the data processing method further comprises:

deleting, according to the value of the sixth key-value object, the data corresponding to the first batch from the key-value storage module.

7. The data processing method according to claim 4, wherein the first version information is generated in the following manner:

obtaining second version information corresponding to the first data storage unit, wherein the second version information indicates a first batch corresponding to data that has been included in the first data storage unit; and generating, based on the first batch, a second batch for continuing to write data in the first data storage unit; and obtaining the first version information based on the second version information and the second batch.

8. The data processing method according to claim 7, wherein before the generating, based on the first batch, a second batch for continuing to write data in the first data storage unit, the data processing method further comprises:

obtaining the data lock of the first data storage unit, and locking the data lock; and after the obtaining the first version information, the data processing method further comprises:

unlocking the data lock of the first data storage unit.

9. The data processing method according to claim 1, wherein the data processing method further comprises:

receiving a data query request;

determining a storage range, in the key-value storage module, of data requested by the data query request;

processing data in the storage range to obtain a column block that is supported by the columnar storage module for processing; and processing the column block to obtain query data that meets the data query request.

10. The data processing method according to claim 9, wherein the data query request includes a data storage unit identifier, the data storage unit identifier is used to identify a data storage unit to which data requested by the data query request belongs, and the determining a storage range, in the key-value storage module, of data requested by the data query request comprises:

determining a target batch of data stored in the data storage unit identified by the data storage unit identifier, and determining a third row number of data stored in a largest batch in the target batch, wherein a row corresponding to the third row number is a last row of the largest batch; and determining the storage range based on the target batch and the third row number, wherein the storage range is from a first row of a smallest batch in the target batch to the last row of the largest batch.

11. An electronic device, wherein the electronic device comprises a processor and a memory;

the processor is configured to execute instructions stored in the memory, so that the electronic device is configured for:

receiving a data write request, wherein the data write request is used to request to write target data in a target write manner, the target data comprises at least one row of data;

in response to the target write manner being a first write manner, writing, by using a key-value storage manner, the target data into a key-value storage module for storage, so that the target data is subsequently read from the key-value storage module, each row of data in the at least one row of data respectively corresponds to one key-value pair, and a data write amount corresponding to the first write manner is less than a first threshold;

or, in response to the target write manner being a second write manner, writing, by using a columnar storage technology, the target data into a columnar storage module for storage, wherein a data write amount corresponding to the second write manner is greater than the data write amount corresponding to the first write manner;

wherein the key-value storage module and the columnar storage module are obtained by dividing a columnar storage data warehouse, wherein the writing, by using the key-value storage manner, the target data into the key-value storage module for storage comprises:

obtaining a first key-value object corresponding to a data lock in the key-value storage module, wherein a key of the first key-value object indicates that the first key-value object corresponds to the data lock, and a value of the first key-value object indicates a state of the data lock;

in response to the value of the first key-value object indicating that the data lock is in an unlocked state, modifying the value of the first key-value object to obtain a second key-value object, wherein a value of the second key-value object indicates that the data lock is in a locked state; and writing, by using the key-value storage manner, the target data into the key-value storage module for storage;

wherein the key of the first key-value object indicates that the first key-value object corresponds to a data lock of a first data storage unit, and the value of the first key-value object further indicates a first row number of data that has been stored in the first data storage unit;

wherein the writing, by using the key-value storage manner, the target data into the key-value storage module for storage comprises writing the target data into the first data storage unit in the key-value storage module by using the key-value storage manner; and wherein the value of the second key-value object further indicates a second row number of data stored in the first data storage unit after the target data is written into the first data storage unit.

12. The electronic device according to claim 11, wherein after the writing the target data into the first data storage unit in the key-value storage module by using the key-value storage manner, the electronic device is further configured for:

modifying the value of the second key-value object to obtain a third key-value object, wherein a value of the third key-value object indicates that the data lock is in the unlocked state and the second row number of data that has been stored in the first data storage unit.

13. The electronic device according to claim 11, wherein the electronic device is further configured for:

storing, by using the columnar storage technology, data stored in the first data storage unit in the columnar storage module, wherein the first data storage unit includes at least one batch of written data, and the at least one batch of written data comprises the target data.

14. The electronic device according to claim 11, wherein the storing, by using the columnar storage technology, data stored in the first data storage unit in the columnar storage module comprises:

obtaining first version information corresponding to the first data storage unit, wherein the first version information indicates a first batch corresponding to data that has been written in the first data storage unit and a second batch that is currently used for writing data; and reading, from the first data storage unit, data corresponding to the first batch, and storing, by using the columnar storage technology, the data corresponding to the first batch in the columnar storage module.

15. The electronic device according to claim 14, wherein before the reading, from the first data storage unit, data corresponding to the first batch, and storing, by using the columnar storage technology, the data corresponding to the first batch in the columnar storage module the electronic device is further configured for:

modifying a value of a fourth key-value object carrying the first version information to obtain a fifth key-value object, wherein a value of the fifth key-value object indicates that the data corresponding to the first batch is in a dumping state; and after the storing, by using the columnar storage technology, the data corresponding to the first batch in the columnar storage module the electronic device is further configured for:

modifying the value of the fifth key-value object to obtain a sixth key-value object, wherein a value of the sixth key-value object indicates that the data corresponding to the first batch has been successfully stored in the columnar storage module.

16. A non-transitory computer-readable storage medium, comprising instructions, wherein the instructions instruct a device to execute the data processing method according to claim 1.

* * * * *

UNITED STATES PATENT AND TRADEMARK OFFICE
CERTIFICATE OF CORRECTION

PATENT NO. : 12,393,562 B2  
APPLICATION NO. : 18/958789  
DATED : August 19, 2025  
INVENTOR(S) : Zhaowei Huang and Yuanpu Ding Page 1 of 1

It is certified that error appears in the above-identified patent and that said Letters Patent is hereby corrected as shown below:

In the Claims

Column 28, Claim 15, Line 11, delete "module" and insert --module,--

Column 28, Claim 15, Line 20, delete "module" and insert --module,--

Signed and Sealed this  
Sixteenth Day of December, 2025

John A. Squires  
*Director of the United States Patent and Trademark Office*